J. J. FIELDS.
TIRE.
APPLICATION FILED JAN. 6, 1912.
1,079,755.
Patented Nov. 25, 1913.
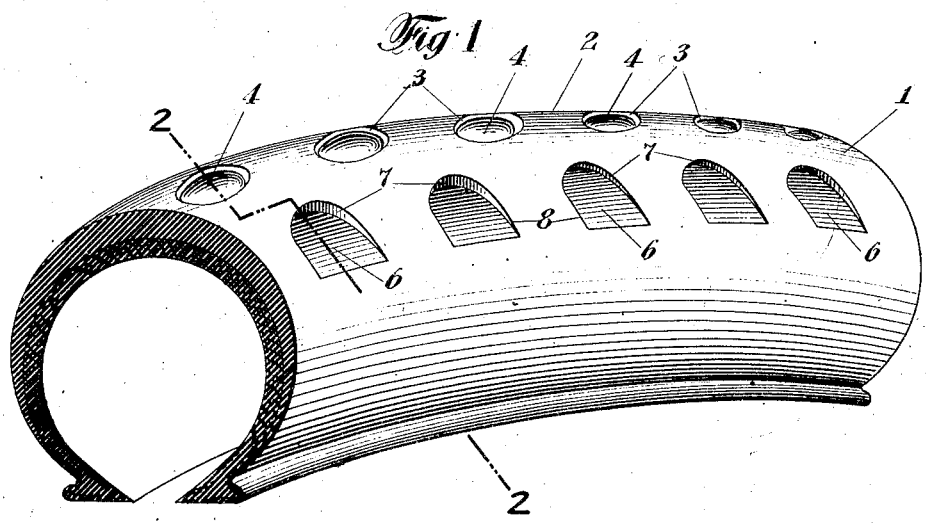
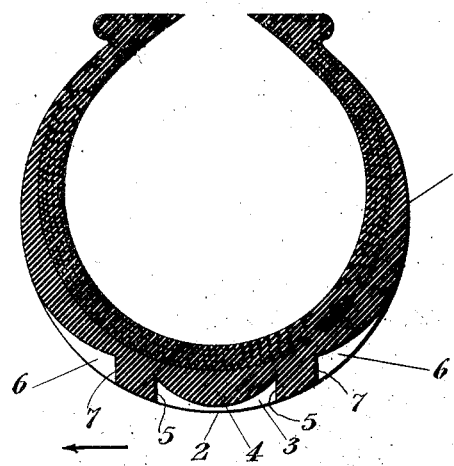
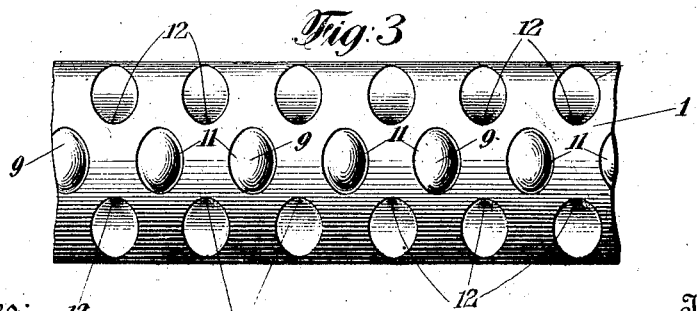
Witnesses:
Inventor
John J. Fields
By his Attorney
Pennington Halsted

UNITED STATES PATENT OFFICE.

JOHN J. FIELDS, OF NEW YORK, N. Y.

TIRE.

1,079,755. Specification of Letters Patent. Patented Nov. 25, 1913.

Application filed January 6, 1912. Serial No. 669,830.

*To all whom it may concern:*

Be it known that I, JOHN J. FIELDS, a citizen of the United States of America, residing in the city of New York and State of New York, have invented certain new and useful Improvements in Tires, of which the following is a specification.

My invention relates to tires for vehicle wheels, and more particularly for heavy vehicles, such as automobiles.

The principal objects of my invention are to prevent slipping and skidding of the wheels, to compensate for or overcome suctional action upon the tire that would be likely to retard its free revolution, and to provide a tire that will stand any strain to which it can be subjected.

My invention consists of the structure hereinafter described and set forth in the claims.

In the accompanying drawing, Figure 1 is a perspective view of one embodiment of my invention; Fig. 2 is a transverse section on the line 2—2 of Fig. 1, and Fig. 3 is a plan view of a slightly different form of tire from that shown in the other figures.

Similar characters represent like parts in all the figures.

1 is a tire or traction portion of a wheel, and preferably of some elastic material such as india rubber, the central tread portion 2 of which is thicker than the rest. Extending around said portion 2 are a series of depressions 3, preferably round, and provided with outwardly projecting nibs 4, which do not extend quite as far as the outer surface of said portion 2. These nibs 4 are also preferably round and tapering, and the portions of the depressions 3 surrounding said nibs are formed into wedge shaped recesses 5.

6 are wedge shaped depressions arranged on the parts of the tire next to the portion 2, on either side of the depressions 3, and preferably in staggered relation to the depressions 3. The bases 7 of said wedges are curved, are nearest to the central portion 2, and their inner sides 7× tapering from base to edge, and preferably convex, and their opposite sides 8 are preferably parallel.

If there should be a tendency for the tire 1 to slip along the ground, the air surrounding the nibs 3 in the recesses 5 would be compressed, and cause a resistance to the slipping action, and an air cushion will also be formed between the nibs 4 and the ground to compensate for any tendency to suction of the tire to the ground, and to assist it in its traction movements. If the tire 1 should have a tendency to slide sidewise or skid, say, to the direction of the arrow Fig. 2, the air contained in the wedge shaped recesses 5 and 6 between the tire and the ground, would be caused to be converged by and compressed against the base of the wedge, thus forming a resistance to the skidding movement, and also forming an air cushion to overcome or compensate for any tendency to skid. The air compressing action and resistance are marked in the recesses 6 when the inclined surface of said recesses rests upon the ground.

In Fig. 3, I have shown the central depressions 9 as well as the other depressions 10 of oval form, the sides 11 of the wedge as well as its base 12 being curved.

My improved tire is practically non-slipping and non-skidding, assists materially the traction action of the wheel, and will stand a great amount of wear and strain without injuring it or impairing its efficiency.

What I claim as new and desire to secure by Letters Patent is:

1. A tire having its portions next to its central portion provided with lateral wedge shaped depressions sunk beneath the normal curved outer contour of the tire, and the bases of said depressions contracting toward said central portion.

2. A tire having its portions next to its central portions provided with lateral wedge shaped depressions sunk beneath the normal curved outer contour of the tire, and the bases of said depressions curved and contracting toward said central portion.

3. A tire having its central portion provided with depressions, and the portions of the tire next to said central portion provided with lateral wedge shaped depressions sunk beneath the normal outer curved contour of the tire, and the bases of said wedge shaped depressions contracting toward said central portion.

4. A tire having its central portion provided with depressions, and the portions of the tire next to said central portion provided with lateral wedge shaped depressions sunk beneath the normal outer curved contour of the tire, and the bases of said wedge shaped depressions curved and contracting toward said central portion.

5. A tire having its central portion provided with depressions, and the portions of the tire next to said central portion provided with lateral wedge shaped depressions sunk beneath the normal outer curved contour of the tire, the bases of said wedge shaped depressions contracting toward said central portion and said wedge shaped depressions arranged in staggered relation to the central depressions.

6. A tire having its central portion provided with depressions, and the portions of the tire next to said central portion provided with lateral wedge shaped depressions sunk beneath the normal outer curved contour of the tire, the bases of said wedge shaped depressions curved and contracting toward said central portion, and said wedge shaped depressions arranged in staggered relation to the central depressions.

In testimony whereof, I have signed my name to this specification, in the presence of two subscribing witnesses.

JOHN J. FIELDS.

Witnesses:
Wm. S. Young,
G. A. Kaven.